US011789452B2

(12) United States Patent
 Li

(10) Patent No.: US 11,789,452 B2
(45) Date of Patent: Oct. 17, 2023

(54) METHOD FOR CONTROLLING INTELLIGENT PALLET

(71) Applicant: Zhipeng Li, Guangdong (CN)

(72) Inventor: Zhipeng Li, Guangdong (CN)

( * ) Notice: Subject to any disclaimer, the term of this patent is extended or adjusted under 35 U.S.C. 154(b) by 570 days.

(21) Appl. No.: 17/098,457

(22) Filed: Nov. 16, 2020

(65) Prior Publication Data
 US 2021/0064052 A1 Mar. 4, 2021

Related U.S. Application Data

(63) Continuation of application No. PCT/CN2020/079457, filed on Mar. 16, 2020.

(30) Foreign Application Priority Data
 Jun. 10, 2019 (CN) .......................... 201910498315.6

(51) Int. Cl.
 *G05D 1/02* (2020.01)
 *B60L 53/36* (2019.01)
 (Continued)

(52) U.S. Cl.
 CPC ............ *G05D 1/0225* (2013.01); *B60L 53/36* (2019.02); *G01C 21/3415* (2013.01);
 (Continued)

(58) Field of Classification Search
 CPC .............. G05D 1/0225; G05D 1/0212; G05D 2201/0216; B60L 53/36; G01C 21/3415;
 (Continued)

(56) References Cited

U.S. PATENT DOCUMENTS 10,890,911 B2 * 1/2021 Xiao ....................... G10L 15/22
2008/0201044 A1 * 8/2008 Yamada ................. B66F 17/003
 701/50

(Continued)

FOREIGN PATENT DOCUMENTS

BR 9604488 6/1998
CN 201801014 4/2011
(Continued)

OTHER PUBLICATIONS

Office Action of China Counterpart Application, dated Jul. 27, 2021, pp. 1-7.

*Primary Examiner* — Krishnan Ramesh
(74) *Attorney, Agent, or Firm* — JCIP GLOBAL INC.

(57) ABSTRACT

This application relates to a technical field of cargo transportation and provides a method for controlling an intelligent pallet. The method includes: acquiring current shelf location information and performing movement according to the current shelf location information; acquiring cargo information and retrieving preset path information; acquiring weight information of current cargo and retrieving inclination angle threshold information; acquiring actual inclination angle information, and modifying the preset path information to generate updating path information by comparing the actual inclination angle information with the inclination angle threshold information; associating the updating path information with the cargo information and the cargo weight information and replacing the preset path information with the updating path information; and performing movement according to the updating path information. This application has an effect of improving the efficiency of cargo transportation.

11 Claims, 5 Drawing Sheets

(51) Int. Cl.
  *G01C 21/34* (2006.01)
  *G06Q 10/0631* (2023.01)
  *G06Q 50/28* (2012.01)
  *G10L 15/22* (2006.01)
(52) U.S. Cl.
  CPC ..... *G05D 1/0212* (2013.01); *G06Q 10/06315* (2013.01); *G06Q 50/28* (2013.01); *G10L 15/22* (2013.01); *G05D 2201/0216* (2013.01); *G10L 2015/223* (2013.01)
(58) Field of Classification Search
  CPC .. G06Q 10/06315; G06Q 50/28; G10L 15/22; G10L 2015/223
  USPC .......................................................... 701/26
  See application file for complete search history.

(56) References Cited

U.S. PATENT DOCUMENTS

| | | | | |
|---|---|---|---|---|
| 2010/0266381 | A1* | 10/2010 | Chilson | G05D 1/024 414/809 |
| 2012/0239262 | A1* | 9/2012 | Reinert | B66F 9/07559 701/50 |
| 2016/0090700 | A1* | 3/2016 | Tanaka | E01C 19/004 701/532 |
| 2019/0062064 | A1* | 2/2019 | Ogawa | G08B 17/113 |
| 2020/0233421 | A1* | 7/2020 | Han | G05D 1/0223 |
| 2022/0227590 | A1* | 7/2022 | Haban | G06Q 10/00 |

FOREIGN PATENT DOCUMENTS

| | | | | |
|---|---|---|---|---|
| CN | 106516351 | | 3/2017 | |
| CN | 207541445 | | 6/2018 | |
| CN | 108444493 | | 8/2018 | |
| CN | 207810578 | | 9/2018 | |
| CN | 109034697 | A * | 12/2018 | ......... G06K 17/0029 |
| CN | 208325954 | | 1/2019 | |
| CN | 109455381 | | 3/2019 | |
| JP | 2015089762 | A * | 5/2015 | ............ B60N 2/002 |

* cited by examiner

METHOD FOR CONTROLLING INTELLIGENT PALLET

CROSS-REFERENCE TO RELATED APPLICATION

The present application is a continuation of international PCT application serial No. PCT/CN2020/079457 filed on Mar. 16, 2020, which claims the priority benefit of China application No. 201910498315.6 filed on Jun. 10, 2019. The entirety of each of the above mentioned patent applications is incorporated herein by reference and made a part of this specification.

BACKGROUND

Technical Field

This application relates to a technical field of cargo transportation, and more particularly, to a method for controlling an intelligent pallet.

Description of Related Art

As of now an intelligent pallet is commonly used in the logistics industry, in which cargo are transported efficiently by the intelligent pallet.

The intelligent pallet known by those skilled in the art can identify the location of a shelf and moves itself thereto. A robotic arm places the cargo on the intelligent pallet, then the intelligent pallet transports the cargo to a designated location according to a prescribed path.

Above technical solution has the following deficiencies. Because the intelligent pallet transports the cargo merely regarding to the prescribed path, if there is a slope on the path, the intelligent pallet will tilt when it is moving through the slope. If the cargo are relatively heavy, the tilt of the intelligent pallet could move the center of gravity of the cargo out of the intelligent pallet with ease, such causes the cargo on the intelligent pallet to fall off the intelligent pallet. Therefore, the cargo needs to be manually replaced on the intelligent pallet under above circumstance, which declines the efficiency of cargo transportation.

SUMMARY

In view of the deficiencies present in existing technical solution, the present application provides a method for controlling an intelligent pallet and the intelligent pallet, which can improve the efficiency of cargo transportation.

In a first aspect, this application provides a method for controlling an intelligent pallet including:
  acquiring a current shelf location information and moving the intelligent pallet according to the current shelf location information;
  acquiring a cargo information of current cargo and retrieving a preset path information corresponding to the cargo information of current cargo according to a preset relationship between the cargo information and the preset path information;
  acquiring a weight information of the current cargo and retrieving an inclination angle threshold information corresponding to the weight information from a preset relationship between the weight information and the inclination angle threshold information;
  acquiring an actual inclination angle information, and modifying the preset path information to generate an updating path information according to a result obtained by comparing the actual inclination angle information with the inclination angle threshold information;
  associating the updating path information with the cargo information and the weight information and replacing the preset path information with the updating path information; and
  moving the intelligent pallet according to the updating path information.

In the above technical solution, the intelligent pallet acquires the shelf location information and moves to the shelf based thereon, and acquires the cargo information to determine the preset path information of the intelligent pallet, so that the intelligent pallet can move according to the preset path information. In the meantime, the intelligent pallet acquires the weight information of the cargo to determine the inclination angle threshold information. When moving according to the preset path information, if there is a slope to pass, the intelligent pallet acquires the actual inclination angle information, compares the actual inclination angle information with the inclination angle threshold information to generate an updating path information according to the result obtained by the comparison, and moves according to the updating path information. Meanwhile, the updating path information is associated with the cargo information and the weight information and, the preset path information is replaced by the updating path information. If the cargo to be placed on the intelligent pallet next time has the same cargo information and weight information as those of the cargo that is placed this time, the cargo moves according to the updating path information updated this time, so that the movement path of the intelligent pallet is associated with the weight of the cargo carried by the intelligent pallet, therefore cargo on the intelligent pallet are not easy to fall off due to the slope on the moving path, which improves the efficiency of cargo transportation.

Further, the method includes:
  acquiring a current obstacle information and retrieving an avoiding solution information corresponding to the obstacle information from a preset relationship between the obstacle information and the avoiding solution information; and
  performing a getting-around operation according to the avoiding solution information.

In the above technical solution, the obstacle information is acquired and the avoiding solution information is acquired according to the obstacle information. The avoidance is performed according to the avoiding solution information, so that cargo on the intelligent pallet are not easy to fall off due to collision with the obstacle, which improves the efficiency of cargo transportation.

Further, the method includes:
  acquiring a driving-region range information; and
  modifying the updating path information according to the driving-region range information.

In the above technical solution, the updating path information is modified according to the driving-region range information, so that the movement path of the intelligent pallet is within the range of a driving region, and the intelligent pallet is not easy to drive out of the designated range, therefore objects out of the designated range is uneasy to contact the cargo.

Further, the method includes:
  acquiring the weight information of the current cargo;
  acquiring a difference between the weight information of the current cargo and a preset weight information; and determining whether to output alarm information according to the difference.

In the above technical solution, when the weight information of the cargo exceeds the preset weight information, it indicates that the intelligent pallet is in an overweight state and the normal transportation of the cargo will be affected, therefore, alarm information is output to warn a staff.

Further, the method includes:
acquiring s moving state information; and
determining whether to output the alarm information according to the moving state information.

In the above technical solution, when the intelligent pallet gets stuck, the moving state information indicates that the intelligent pallet is not in a moving state and the cargo cannot be transported normally. Therefore, the alarm information is output to warn the staff.

Further, the method includes:
acquiring the weight information of the current cargo;
retrieving a braking mode information corresponding to the weight information according to a preset relationship between the weight information of the current cargo and the braking mode information; and performing braking according to the corresponding braking mode information.

In the above technical solution, the braking mode information is determined according to the weight information of the cargo. Braking is performed according to the braking mode information, so that the speed reduction rate matches the weight of the cargo, thereby reducing the probability of the cargo falling off the intelligent pallet.

Further, the method includes:
acquiring a current power information;
comparing the current power information with a preset power threshold information; and
determining whether to perform a charging operation according to a result obtained by comparison.

In the above technical solution, the current power information is compared with the preset power threshold information. In particular, if the current power information is smaller than the preset power threshold information, it indicates that the charging operation is required to ensure that the intelligent pallet can obtain power in time, so that the efficiency of cargo transportation is not easily reduced.

Further, the charging operation includes:
acquiring a pallet location information and a charging-point location information;
establishing a returning-for-charging path according to the pallet location information and the charging-point location information;
determining power consumption for returning according to the returning-for-charging path; and
determining whether to output an emergency charging request according to the power consumption for returning and the current power information.

When the current electricity is not sufficient for finishing a relatively long returning-for-charging path, the emergency charging request is output to realize an emergency charging, so that the intelligent pallet can move to the charging point for charging.

Further, the method includes:
acquiring an external voice information;
determining an instruction information according to the external voice information;
retrieving an execution information corresponding to the instruction information from a preset relationship between the instruction information and the execution information; and
performing an execution according to the execution information.

In the above technical solution, voice information is input from outside, according to which the corresponding execution information is retrieved and execution is performed. Therefore, the staff does not need to search for the intelligent pallet and perform operation manually, which improves work efficiency.

Further, the method includes:
acquiring a designated following information transmitted from an external terminal;
acquiring a location information of the external terminal; and
moving the intelligent pallet according to the location information of the external terminal.

In the above technical solution, upon receiving the designated following information transmitted from outside, the location information of the external terminal is immediately obtained, and movement is performed thereon, thereby achieving following.

Further, performing the movement according to the location information of the external terminal further includes:
establishing a movement path according to the location information of the external terminal by setting a location of the intelligent pallet itself as an origin;
updating the location information of the external terminal in real time and re-establishing the movement path; and
moving of the intelligent pallet according to the re-established movement path.

In the above technical solution, the movement path between the external terminal and the intelligent pallet itself is established by using the location of the intelligent pallet itself as the origin. Since the location information of the external terminal changes over time, the location information of the external terminal is updated in real time, the movement path is re-established thereon, and then movement is performed according to the real-time movement path.

In a second aspect, this application provides an intelligent pallet including:
a supporting plate, configured to carry cargo;
a central processing unit, configured to acquire and process information and output a control information;
a weight acquiring unit, configured to acquire a weight information of the cargo and transmit it to the central processing unit;
an inclination angle acquiring unit, configured to acquire an inclination angle information of the supporting plate and transmit it to the central processing unit;
a wireless communication unit, configured to acquire an external information and transmit it to the central processing unit;
an information storing unit, configured to store a preset path information for the central processing unit to call up or modify;
a driving unit, configured to receive the control information transmitted from the central processing unit and drive the supporting plate to move; and
a power supply unit, configured to supply power for the central processing unit.

In summary, this application has the following beneficial effects:

1. The intelligent pallet can respond to road conditions and generate new paths by acquiring the weight information and the inclination angle threshold information, reducing falling-off possibility of the cargo and improving the efficiency of cargo transportation.

2. The braking mode is determined according to the weight of the cargo, so that the braking is gently conducted, which reduces the falling-off possibility of the cargo and improving the efficiency of cargo transportation.

3. The carrying surface for the cargo can be changed corresponding to the cargo by providing an auxiliary plate body and a reinforcing members, in which the reinforcing member can also serve as a guardrail for preventing the cargo from falling off.

DESCRIPTION OF THE EMBODIMENTS

This application is described in detail below in connection with drawings.

Figure 1:
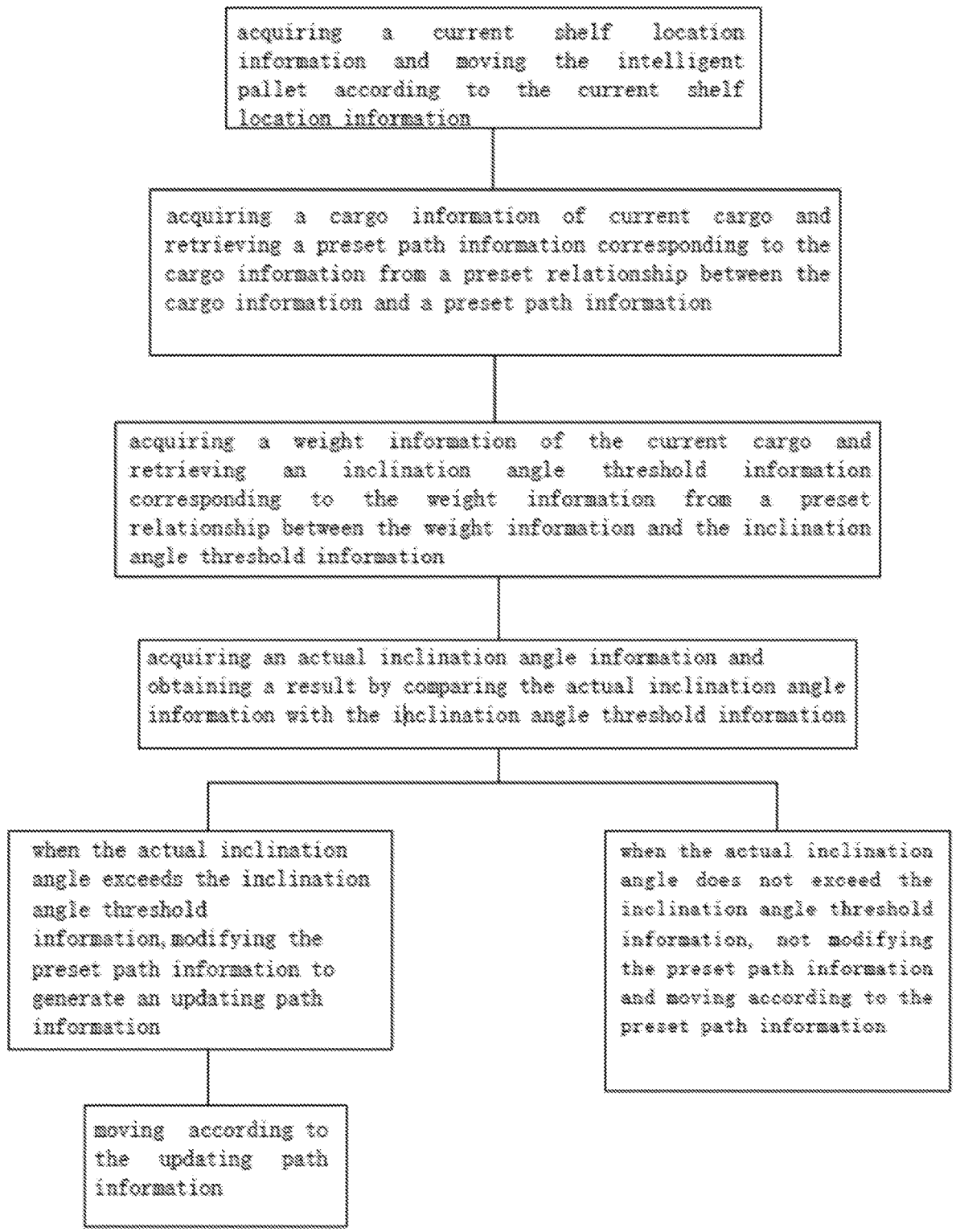
FIG. 1 is a flow chart of a method according to one embodiment of this application.

Referring to FIG. 1, this application provides a method for controlling an intelligent pallet including the following steps: acquiring a current shelf location information and moving the intelligent pallet according to the current shelf location information; acquiring cargo information of current cargo and retrieving a preset path information corresponding to the cargo information from a preset relationship between the cargo information and the preset path information; acquiring a weight information of the current cargo and retrieving an inclination angle threshold information corresponding to the weight information from a preset relationship between the weight information and the inclination angle threshold information; acquiring an actual inclination angle information, and modifying the preset path information to generate an updating path information according to a result obtained by comparing the actual inclination angle information with the inclination angle threshold information; associating the updating path information with the cargo information and the weight information and replacing the preset path information with the updating path information; and moving the intelligent pallet according to the updating path information.

In some embodiment, the cargo information is a preset cargo set, the preset path information is a preset path set, and the preset relationship between the cargo information and the preset path information is a path look-up table relating to a preset cargo set and a preset path set.

In some embodiments, the weight information of the current cargo is a weight value of the current cargo, the inclination angle threshold information is an inclination angle threshold value, and the preset relationship between the weight information and the inclination angle threshold information is an inclination angle threshold table relating to a preset weight set and a preset inclination angle threshold set.

The shelf location information is acquired and the intelligent pallet moves to a shelf according to the shelf location information. A robotic arm 15 grasps the cargo on the shelf and puts them on the intelligent pallet which then acquires the cargo information and the weight information of the cargo. The corresponding preset path information is retrieved according to the cargo information and the corresponding inclination angle threshold information is retrieved according to the weight information. Then, the intelligent pallet is moved according to the preset path information and the actual inclination angle information is acquired during moving. The actual inclination angle information is compared with the inclination angle threshold information, by which if the actual inclination angle information exceeds the inclination angle threshold information, the preset path information is modified to generate the updating path information, according to which the intelligent pallet is moved. In addition, the updating path information is associated with the cargo information and the weight information, and the updating path information replaces the preset path information, thereby achieving memory, so that the updating path information is put to use when the cargo to be transported next time has the same cargo information and weight information as those of the cargo transported at this time.

The method for controlling the intelligent pallet further includes: acquiring a current obstacle information and retrieving an avoiding solution information corresponding to the current obstacle information from a preset relationship between the obstacle information and the avoiding solution information; and performing a getting-around operation according to the avoiding solution information. In some embodiments, the preset relationship between the obstacle information and the avoiding solution information is an avoiding solution table relating to a preset obstacle information set and the avoiding solution information.

The current obstacle information is acquired and the avoiding solution information is retrieved according to the obstacle information. If the obstacle information indicates that there is an obstacle on the left, a right turning is retrieved according to the obstacle information, that is, there is an obstacle on the left, and the intelligent pallet will conduct right turning according to the avoiding solution information, that is, turning right, so as to avoid the obstacle.

The method for controlling the intelligent pallet further includes: acquiring a driving-region range information; and modifying the updating path information according to the driving-region range information.

The driving-region range information including information about a plurality of location points which are connected to define the driving-region range is acquired. If a path point according to the updating path information is not within the driving-region range, the updating path information is modified so that the path point falls into the driving-region range.

The method for controlling the intelligent pallet further includes: acquiring the weight information of the current cargo; acquiring a difference between the weight information and a preset weight information; and determining whether to output alarm information according to the difference. In some embodiment, the weight information is a weight value and the preset weight information is a preset weight set.

The weight information of the cargo is acquired and is subtracted from the preset weight information to get a value. If the value is negative or equal to zero, it indicates that the weight information of the cargo is smaller than the preset weight information, the cargo is not overweight, and an alarm information will not be output; while if the value is positive, it indicates that the weigh information of the cargo is larger than the preset weight information, the cargo is overweight, and an alarm information will be output.

The method for controlling the intelligent pallet also includes: acquiring a moving state information; and determining whether to output an alarm information according to the moving state information.

The moving state information is acquired. If the moving state information indicates that the intelligent pallet is moving, it shows that the intelligent pallet is in a normal moving state, and an alarm information will not be output; while if the moving state information indicates that the intelligent pallet is not in a normal moving state, the intelligent pallet may get stuck, and an alarm information will be output.

The method for controlling the intelligent pallet further includes: acquiring the weight information of the current cargo; retrieving a braking mode information corresponding to the weight information from a preset relationship between the weight information and the braking mode information; and performing braking according to the corresponding braking mode information. In some embodiment, the preset relationship between the weight information of the current cargo and the braking mode information is a braking mode table relating to the weight value and the braking mode information.

The braking mode information is acquired according to the weight information of the cargo. If the cargo are fairly heavy, it slowly brakes so that the cargo are not easy to fall off due to inertia, while if the cargo are fairly light, it quickly brakes.

The method for controlling the intelligent pallet further includes: acquiring a current power information; comparing the current power information with a preset power threshold information; and determining whether to perform charging operation according to the result of the comparison. In some embodiments, the preset power threshold information is a preset power threshold table.

The current power information is acquired and the current power information is compared with the preset power threshold information. If the current power information is smaller than or equal to the preset power threshold information, it indicates that a power supplement is needed; while if the current power information is larger than the preset power threshold information, it indicates that there is no need to supply power.

The charging operation includes: acquiring a pallet location information and a charging-point location information; establishing a returning-for-charging path according to the pallet location information and the charging-point location information; determining a power consumption for returning according to the returning-for-charging path; and determining whether to output an emergency charging request according to the power consumption for returning and the current power information.

When it requires charging, the returning-for-charging is established according to the pallet location information and the charging-point location information, and the power consumption for returning is determined according to the returning-for-charging path. When the power consumption for returning is smaller than the current power information, it indicates that the current power can provide sufficient support for the intelligent pallet to reach the charging point; and when the power consumption for returning is larger than the current power information, it indicates that the current power cannot provide sufficient support for the intelligent pallet to reach the charging point, therefore emergency charging request is output.

The method for controlling the intelligent pallet further includes: acquiring an external voice information; determining an instruction information according to the external voice information; retrieving an execution information corresponding to the instruction information from a preset relationship between the instruction information and the execution information; and performing an execution according to the execution information. In some embodiments, the preset relationship between the instruction information and the execution information is a preset execution information table relating to the instruction information and the execution information.

The instruction information is determined according to the external voice information, the execution information is retrieved according to the external voice information, and execution is performed according to the execution information, so as to achieve voice control.

The method for controlling the intelligent pallet further includes: acquiring a designated following information transmitted from an external terminal; acquiring a location information of the external terminal; establishing a movement path according to the location information of the external terminal by setting a location of the intelligent pallet itself as an origin; updating the location information of the external terminal in real time and re-establishing the movement path; and moving the intelligent pallet according to the re-established movement path.

After receiving the designated following information transmitted from the external terminal, the location information of the external terminal is obtained. Then, the movement path between the intelligent pallet itself and the external terminal is established by setting the location of the intelligent pallet itself as an origin, and movement is performed according to the movement path. Once the location information of the external terminal changes, the movement path between the intelligent pallet itself and the external terminal is re-established, and then movement is performed according to the re-established movement path.

Figure 2:
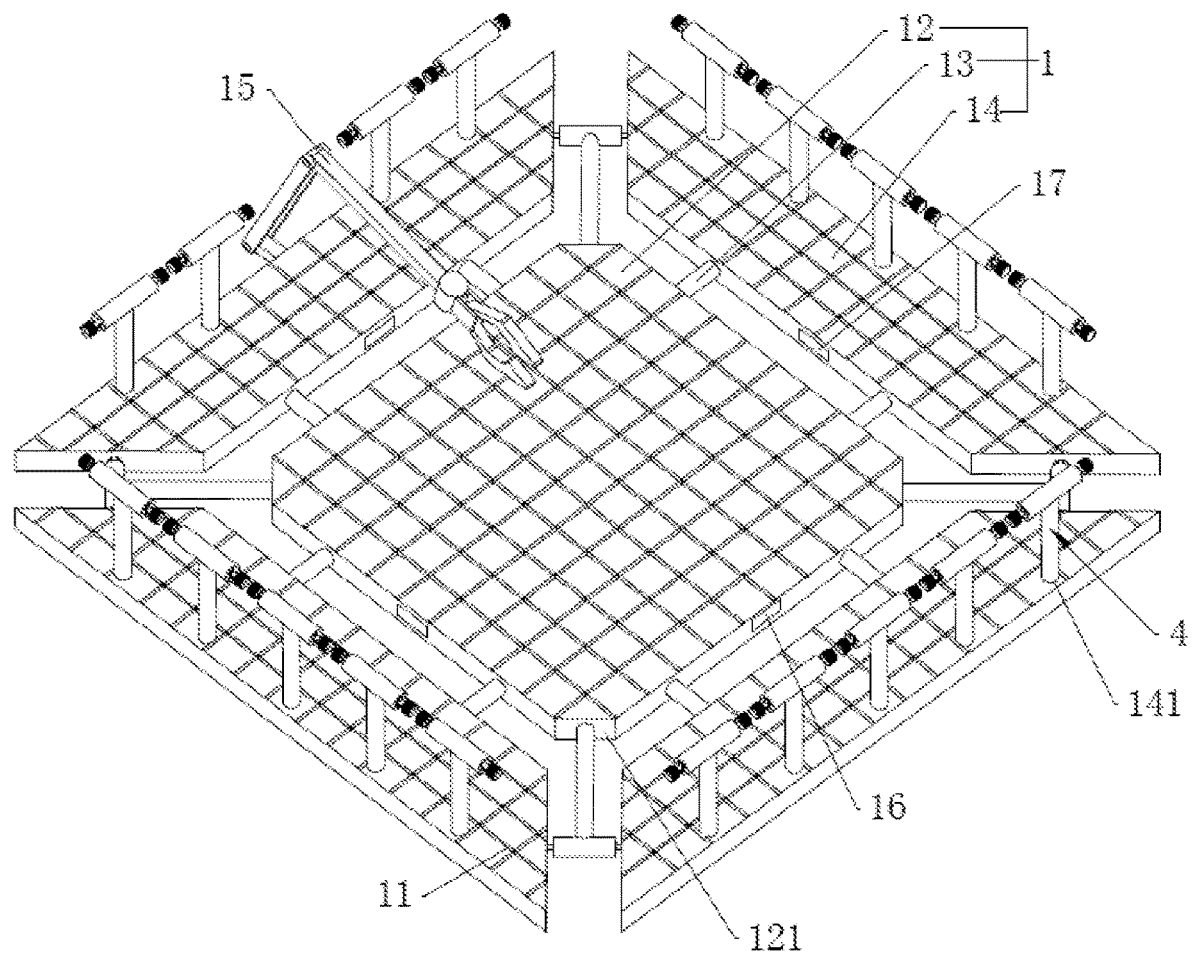
FIG. 2 is a schematic view of an external structure according to one embodiment of this application.
Figure 3:
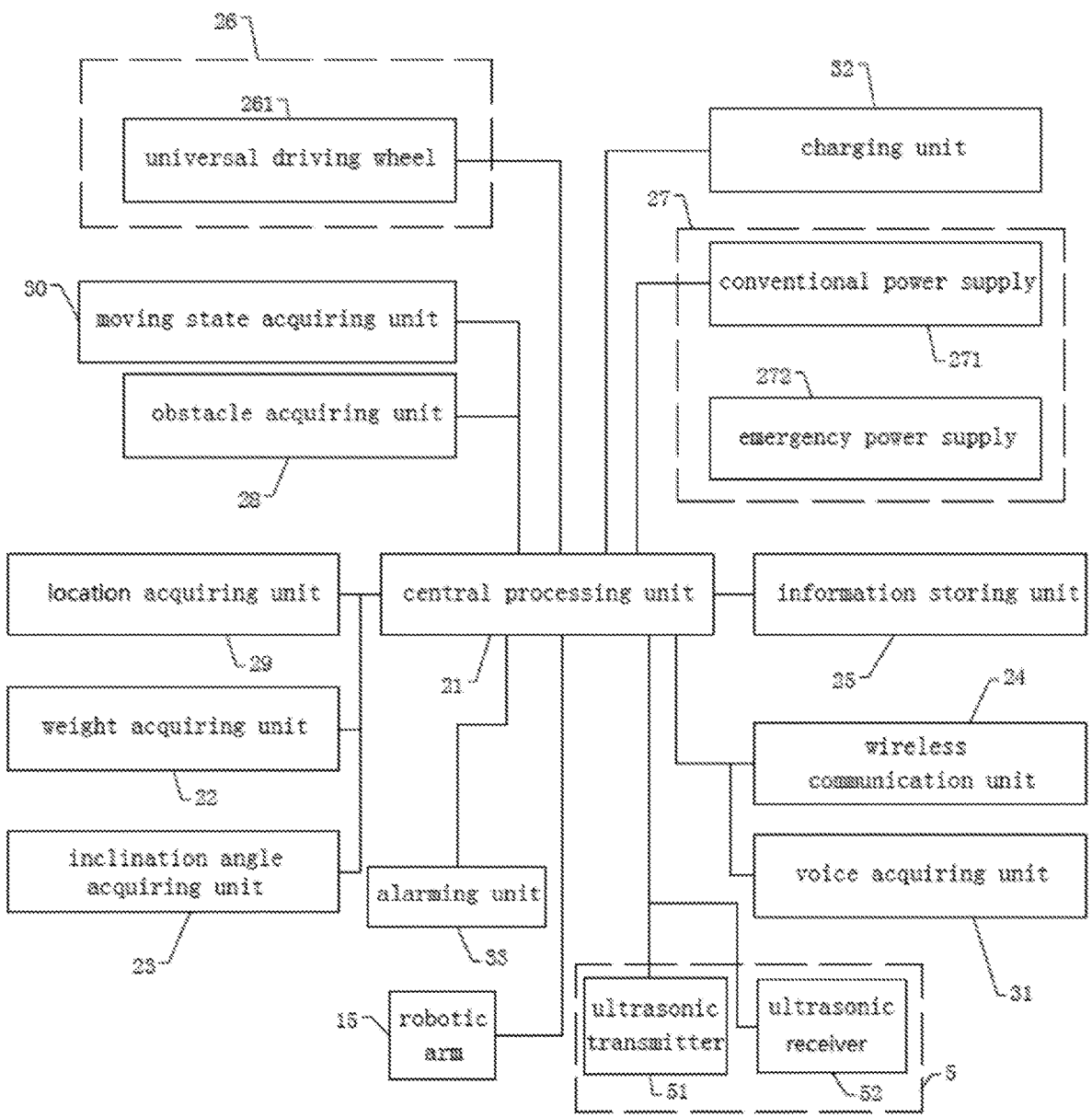
FIG. 3 is a block diagram of a system according to one embodiment of this application.

Referring to FIG. 2 and FIG. 3, an intelligent pallet includes a supporting plate 1, a central processing unit 21, a weight acquiring unit 22, an inclination angle acquiring unit 23, a wireless communication unit 24, an information storing unit 25, a driving unit 26, a following unit 5 and a power supply unit 27. The supporting plate 1 includes a base plate body 12, an extension rod 13 and an auxiliary plate body 14. The base plate body 12 has sliding holes in four side surfaces and mounting planes 121 at four corners. The extension rod 13 is slidably connected in the sliding hole, with one end of the extension rod 13 away from the base plate body 12 being fixedly connected to the auxiliary plate body 14. The auxiliary plate body 14 has fitting surfaces on two ends, and the fitting surfaces of adjacent auxiliary plate body 14 face each other. One side of the auxiliary plate body 14 facing the base plate body 12 has an accommodating slot in which an attracting block 17, for example, a magnet, is fixedly connected, and a side surface of the base plate body 12 has a mounting slot in which an attracting sheet 16, for example, an iron sheet, is fixedly connected. The attracting sheet 16 and the attracting block 17 correspond to each other.

Figure 4:
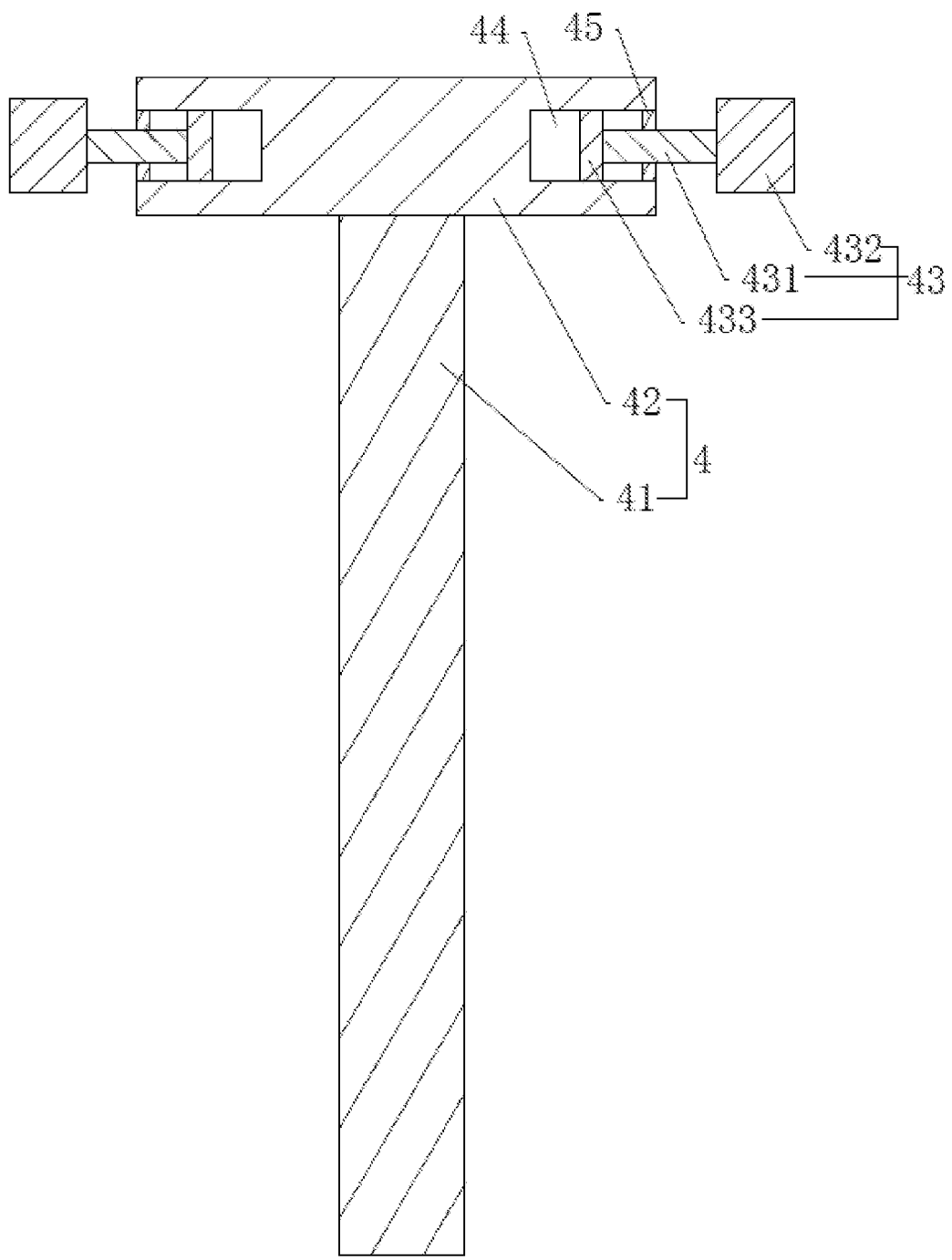
FIG. 4 is a cross-sectional schematic view showing a connection structure between a base rod and a connection rod according to one embodiment of this application.

Referring to FIG. 2 and FIG. 4, the auxiliary plate body 14 has a plurality of connecting holes 141 in which reinforcing members 4 are provided. The reinforcing member 4 includes a base rod 41 and a connection rod 42 which are threadedly and fixedly connected with each other and assume a T-shape after connection. The connection rod 42 is provided with connection members 43 at two ends. The connection member 43 includes a connection block 431, a threaded block 432 and a limit block 433. The connection rod 42 has connection grooves 44 at two ends, a locating block 45 is fixedly connected to an inner wall of the connection groove 44, and the limit block 433 is slidably disposed in the connection groove 44. One end of the connection block 431 is fixedly connected to the limit block 433 with an outer wall of the connection block 431 abutting against the locating block 45, and the other end thereof away from the limit block 433 is fixedly connected to the threaded block 432. Threaded block 432 has a width larger than the diameter of the connection groove 44. A robotic arm 15, is mounted at one end of one of the auxiliary plate bodies 14, and electrically connected to the central processing unit 21.

Figure 5:
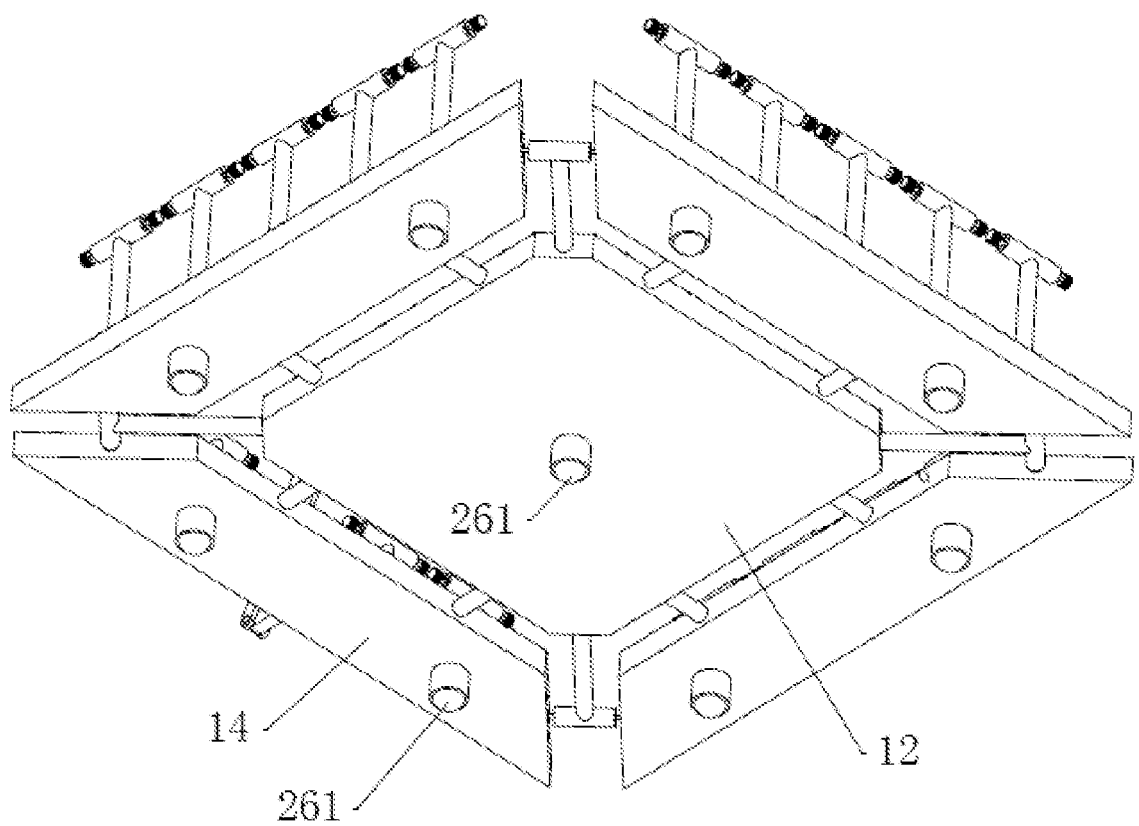
FIG. 5 is a schematic view showing a connection structure between auxiliary plate body and universal driving wheels according to one embodiment of this application.

Referring to FIG. 2 and FIG. 3, the central processing unit 21, the weight acquiring unit 22, the inclination angle acquiring unit 23, the wireless communication unit 24, the information storing unit 25, the driving unit 26, the following unit 5 and the power supply unit 27 are all disposed on the auxiliary plate body 14. Referring to FIG. 2 and FIG. 5, mesh anti-slip strips 11 made of rubber are fixedly connected to upper surfaces of the auxiliary plate body 14 and the base plate body 12. The driving unit 26 includes nine universal driving wheels 261 which are mounted on the supporting plate 1 at one side away from the anti-slip strips 11. In particular, eight universal driving wheels 261 are mounted on the auxiliary plate body 14, and the rest one is mounted on the base plate body 12. The universal driving wheels 261 are electrically connected to the central processing unit 21.

Referring to FIG. 2 and FIG. 3, the weight acquiring unit 22 is a pressure sensor located on the upper surface of the supporting plate 1. The central processing unit 21 is a single-chip microcomputer and is electrically connected to the weight acquiring unit 22. The inclination angle acquiring unit 23 is an inclination angle sensor and is electrically connected to the central processing unit 21. The wireless communication unit 24 is a WIFI module which is electrically connected to the central processing unit 21. The information storing unit 25 is a memory and is electrically connected to the central processing unit 21. The following unit 5 includes an ultrasonic transmitter 51 and an ultrasonic receiver 52, both of which are electrically connected to the central processing unit 21. The power supply unit 27 includes a conventional power supply 271 and an emergency power supply 272, both of which are lithium batteries and are electrically connected to the central processing unit 21.

The intelligent pallet further includes an obstacle acquiring unit 28, a location acquiring unit 29, a moving state acquiring unit 30, a voice acquiring unit 31, a charging unit 32 and an alarming unit 33 which are all disposed on the supporting plate 1. The obstacle acquiring unit 28 is an ultrasonic obstacle avoiding sensor and is electrically connected to the central processing unit 21. The location acquiring unit 29 is a zigbee module and electrically connected to the central processing unit 21, and obtains location information by zigbee indoor locating technology. The moving state acquiring unit 30 a motion sensor and is electrically connected to the central processing unit 21. The voice acquiring unit 31 is a microphone and is electrically connected to the central processing unit 21. The alarming unit 33 is a buzzer and is electrically connected to the central processing unit 21. The charging unit 32 is a wireless charging module which is electrically connected to the conventional power supply 271.

The principle of this embodiment is as follows. The wireless communication unit 24 obtains the shelf location information transmitted from outside and transmits it to the central processing unit 21, and the location acquiring unit 29 acquires the pallet location information and transmits it to the central processing unit 21. Then the central processing unit 21 processes the shelf location information and establishes a motion path between the supporting pallet 1 and the shelf, and controls the driving unit 26 according to the motion path, and the driving unit 26 drives the supporting plate 1 to move to the shelf. The robotic arm 15 located at the shelf acquires the cargo information and transmits it, and the wireless communication unit 24 acquires the cargo information and transmits it to the central processing unit 21. The central processing unit 21 retrieves the corresponding preset path information from the information storing unit 25 according to the cargo information and controls the driving unit 26 according to the preset path information, and the driving unit 26 drives the supporting plate 1 to move. At the same time, the weight acquiring unit 22 acquires the weight information of the cargo and transmits it to the central processing unit 21, and the central processing unit 21 retrieves the corresponding inclination angle threshold information according to the weight information of the cargo. During the movement of the pallet plate 1, the inclination angle acquiring unit 23 acquires the actual inclination angle information of the supporting plate 1 and transmits it to the central processing unit 21 which compares the actual inclination angle information with the inclination angle threshold information. If the actual inclination angle information exceeds or equals to the inclination angle threshold information, it indicates that this section of the path is not suitable for the current cargo, therefore the path is replaned to generate the updating path information. If a path point according to the updating path information is not within the range of the motion region, the updating path information is modified so that the path point falls into the range of the motion region. In addition, the cargo information and the weight information are associated with the updating path information, and the updating path information replaces the preset path information.

During the movement of the supporting plate 1, the obstacle acquiring unit 28 detects the external environment. When there is an obstacle, the obstacle acquiring unit 28 transmits the obstacle information to the central processing unit 21 which retrieves the avoiding solution information and controls the driving unit 26 to avoid the obstacle.

The weight acquiring unit 22 acquires the weight information of the cargo and transmits it to the central processing unit 21 that subtracts the weight information of the cargo from the preset weight information to get the difference. If the difference is negative or equal to zero, it indicates that the weight information of the cargo is smaller than the preset weight information, the cargo is not overweight, and the alarm information will not be output. If the finally obtained value is positive, it indicates that the weigh information of the cargo is larger than the preset weight information, the cargo is overweight, and the alarm information will be output. The alarm information is transmitted to the alarming unit 3 for outputting.

The moving state acquiring unit 30 acquires the moving state information that is received by the central processing unit 21. If the moving state information indicates that the intelligent pallet is moving, it shows that the intelligent pallet is in a normal moving state, and the alarm information will not be output. If the moving state information indicates that the intelligent pallet is not in the normal moving state, the intelligent pallet may get stuck, and the central processing unit 21 outputs the alarm information to the alarming unit 33.

The central processing unit 21 determines the braking mode according to the weight information transmitted from the weight acquiring unit 22. When braking is required, the central processing unit 21 controls the driving unit 26 according to the braking mode.

The central processing unit 21 acquires the current power information of the conventional power supply 271 and compares the current power information with the preset power threshold information. If the current power information is smaller than or equal to the preset power threshold information, it indicates that power supply is required. If the current power information is larger than the preset power threshold information, it indicates that there is no need to supply power. In this way, the central processing unit 21 determines whether it is necessary to control the driving unit 26 to move the supporting plate 1 to a charging point.

When it requires charging, the central processing unit 21 establishes the returning-for-charging path according to the pallet location information and the charging-point location information, and the power consumption for returning is determined according to the returning-for-charging path. When the power consumption for returning is smaller than the current power information, it indicates that the current power can provide sufficient support for the intelligent pallet to reach the charging point. When the power consumption for returning is larger than the current power information, it indicates that the current power cannot provide sufficient support for the intelligent pallet to reach the charging point, and therefore emergency charging request is output for emergency charging, so that the conventional power supply 271 is connected to the emergency power supply 272 under the control of the central processing unit 21 for charging.

When voice control is required, the voice acquiring unit 31 acquires external voice information and transmits it to the central processing unit 21 which determines the instruction information according to the external voice information and outputs the execution information to complete execution.

When the intelligent pallet is required to follow, a user sends a designated following message by a mobile phone or other mobile terminals. Then, the ultrasonic transmitter 51 emits ultrasonic waves, which touch the human body and are reflected by the human body, and are received by the ultrasonic receiver 52, so that the ultrasonic receiver 52 can determine the location of the human body and achieve following.

When loading or unloading is required, the central processing unit 21 directly controls the robotic arm 15 to perform work, without the need of a staff.

When it needs to place a relatively large cargo, a staff drives the auxiliary plate body 14 to move, thereby expanding the carrying area. The base rod 41 located in the connecting hole 41 is taken off and threadedly connected to the mounting plane 121. The threaded block 432 is aligned with an adjacent auxiliary plate body 14 and screwed into it, so that a relatively stable connection is formed between adjacent auxiliary plate bodies 14. In the meantime, cargo can be placed on the base plate body 12 and the auxiliary plate body 14, and part of it can be carried by the extension rod 13. When the auxiliary plate body 14 needs to be reconnected to the base plate body 12, what is needed is to simply disassemble the reinforcing members 4 and then mount them onto the auxiliary plate body 14. The auxiliary plate body 14 approaches the base plate body 12, and the attracting block 17 and the attracting sheet 16 attract each other, so that the auxiliary plate body 14 is attracted onto the base plate body 12, thereby achieving fixation of the auxiliary plate body 14.

What is provided above is merely some preferred embodiments of this application. The scope of this application is not limited by the above embodiments, some improvements and modifications can be made by those skilled in the art without departing from the principle of this application, and should be considered to fall within the scope of this application.

What is claimed is:

1. A method for controlling an intelligent pallet, comprising:
   acquiring a current shelf location information and moving the intelligent pallet according to the current shelf location information;
   acquiring a cargo information of a current cargo and retrieving a preset path information corresponding to the cargo information from a preset relationship between the cargo information and the preset path information;
   acquiring a weight information of the current cargo and retrieving an inclination angle threshold information corresponding to the weight information from a preset relationship between the weight information and the inclination angle threshold information;
   acquiring an actual inclination angle information, and modifying the preset path information to generate an updating path information by comparing the actual inclination angle information with the inclination angle threshold information;
   associating the updating path information with the cargo information and the weight information, and replacing the preset path information with the updating path information; and
   moving the intelligent pallet according to the updating path information.

2. The method for controlling the intelligent pallet according to claim 1, further comprising:
   acquiring a current obstacle information and retrieving an avoiding solution information corresponding to the current obstacle information from a preset relationship between the obstacle information and the avoiding solution information; and
   performing a getting-around operation according to the avoiding solution information.

3. The method for controlling the intelligent pallet according to claim 1, further comprising:
   acquiring a driving-region range information; and
   modifying the updating path information according to the driving-region range information.

4. The method for controlling the intelligent pallet according to claim 1, further comprising:
   acquiring the weight information of the current cargo;
   acquiring a difference between the weight information and a preset weight information; and
   determining whether to output an alarm information according to the difference.

5. The method for controlling the intelligent pallet according to claim 4, further comprising:
   acquiring a moving state information; and
   determining whether to output the alarm information according to the moving state information.

6. The method for controlling the intelligent pallet according to claim 1, further comprising:
   acquiring the weight information of the current cargo;
   retrieving a braking mode information corresponding to the weight information from a preset relationship between the weight information and the braking mode information; and
   performing a braking operation according to the braking mode information corresponding to the weight information.

7. The method for controlling the intelligent pallet according to claim 1, further comprising:
acquiring a current power information;
comparing the current power information with a preset power threshold information; and
determining whether to perform a charging operation.

8. The method for controlling the intelligent pallet according to claim 7, wherein the charging operation comprises:
acquiring a pallet location information and a charging-point location information;
establishing a returning-for-charging path according to the pallet location information and the charging-point location information;
determining a power consumption for returning according to the returning-for-charging path; and
determining whether to output an emergency charging request according to the power consumption for returning and the current power information.

9. The method for controlling the intelligent pallet according to claim 1, further comprising:
acquiring an external voice information;
determining an instruction information according to the external voice information;
retrieving an execution information corresponding to the instruction information from a preset relationship between the instruction information and the execution information; and
performing an execution according to the execution information.

10. The method for controlling the intelligent pallet according to claim 1, further comprising:
acquiring a designated following information transmitted from an external terminal;
acquiring a location information of the external terminal; and
moving the intelligent pallet according to the location information of the external terminal.

11. The method for controlling the intelligent pallet according to claim 10, wherein moving the intelligent pallet according to the location information of the external terminal further comprises:
establishing a movement path according to the location information of the external terminal by setting a location of the intelligent pallet itself as an origin;
updating the location information of the external terminal in real time and re-establishing the movement path; and
moving the intelligent pallet according to the re-established movement path.

* * * * *